(12) United States Patent
Segal et al.

(10) Patent No.: US 8,672,756 B2
(45) Date of Patent: Mar. 18, 2014

(54) ANALOG-SIGNAL CONTROLLER FOR MOBILE ELECTRONIC DEVICES

(75) Inventors: Edo Segal, New York, NY (US); Kent Suzuki, Oakland, CA (US); Dmytro Panin, Zaporozhye (UA)

(73) Assignee: Retoy, LLC, New York, NY (US)

( * ) Notice: Subject to any disclaimer, the term of this patent is extended or adjusted under 35 U.S.C. 154(b) by 224 days.

(21) Appl. No.: 13/209,089

(22) Filed: Aug. 12, 2011

(65) Prior Publication Data
US 2012/0101604 A1    Apr. 26, 2012

Related U.S. Application Data

(60) Provisional application No. 61/405,060, filed on Oct. 20, 2010.

(51) Int. Cl.
*A63F 9/24* (2006.01)

(52) U.S. Cl.
USPC .............................. 463/35; 715/249; 715/776

(58) Field of Classification Search
USPC ................. 463/35, 36; 715/249, 776
See application file for complete search history.

(56) References Cited

U.S. PATENT DOCUMENTS

| | | |
|---|---|---|
| 4,955,967 A | 9/1990 | Houriet, Jr. et al. |
| 5,064,195 A | 11/1991 | McMahan |
| 2006/0192849 A1* | 8/2006 | Inoue .......................... 348/14.08 |
| 2007/0025562 A1 | 2/2007 | Zalewski et al. |
| 2009/0224473 A1 | 9/2009 | Motegi et al. |
| 2011/0111791 A1* | 5/2011 | Martz et al. ................. 455/552.1 |
| 2012/0052925 A1* | 3/2012 | Ku ............................. 455/569.1 |
| 2013/0017887 A1* | 1/2013 | Keithline et al. ............... 463/35 |
| 2013/0265451 A1* | 10/2013 | Son et al. ................... 348/207.1 |

OTHER PUBLICATIONS

"Laserquest Smartphone=Fun." Web log post. Adreama: Life, The Universe and Everything, From the Perspective of Numerous Iterations of Adreama Throughout Life. N.p., Aug. 30, 2009. Web. <adreama.blogspot.com/2009/08/laserquest-smartphone-fun.html>.

* cited by examiner

*Primary Examiner* — Pierre E Elisca
(74) *Attorney, Agent, or Firm* — Leason Ellis LLP

(57) ABSTRACT

A system and method are provided for interfacing with a mobile device. According to one aspect, a method for interfacing one or more peripheral devices with a mobile device having a processor is provided. One or more unique tones/signals are generated at a respective peripheral device corresponding to an event detected by the respective peripheral device. The tones/signals are conveyed to a mobile device where they are received through a microphone in communication with the mobile device. A processor processes the signals into one or more digital commands, and correlates the digital commands with real-time data to identify an action. One or more outputs are then provided based upon the action.

20 Claims, 11 Drawing Sheets

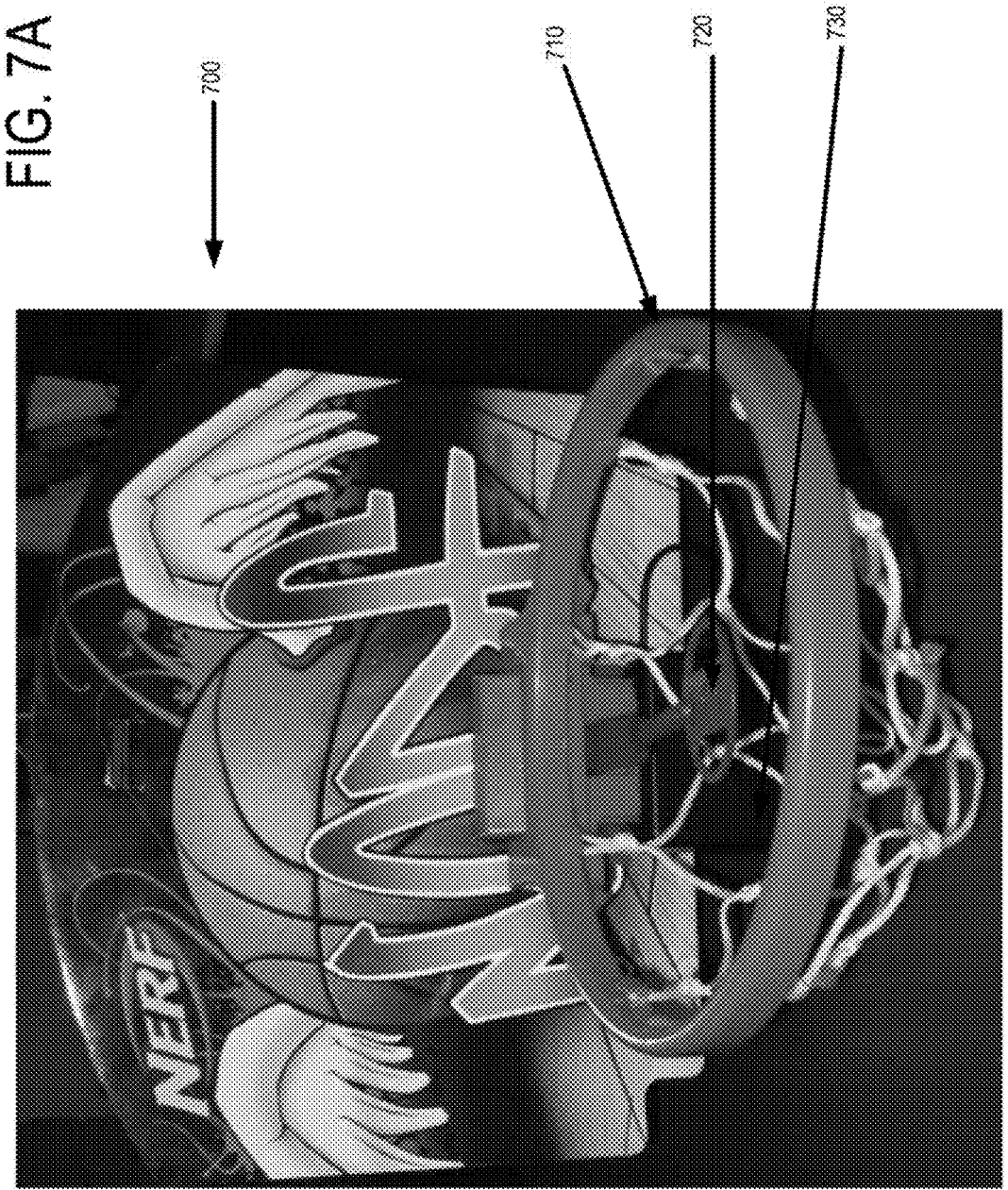

ANALOG-SIGNAL CONTROLLER FOR MOBILE ELECTRONIC DEVICES

CROSS-REFERENCE TO RELATED APPLICATIONS

This application claims the benefit of U.S. Patent Application Ser. No. 61/405,060, filed Oct. 20, 2010, which is hereby incorporated by reference in its entirety.

TECHNICAL FIELD OF THE INVENTION

The present invention generally relates to interfacing with mobile devices. More specifically, the present invention relates to a system and method for processing signals into digital commands and correlating the digital commands with real-time data.

BACKGROUND OF THE INVENTION

Developments in mobile technology have brought increasingly sophisticated mobile devices to the consumer market. Smartphones—portable cellular phones with robust computing capabilities and a variety of functionalities beyond simple telephone tasks—are quickly becoming ubiquitous. Various smartphones, such as the Apple iPhone® and devices running Google's Android platform, enable the user to run various applications (or "apps") which make use of the smartphone's various input and output devices, including the phone's camera, microphone, speaker, and touch screen.

Various peripherals have also been designed which interact with and add functionality to the smartphone to which they are connected. For instance, a variety of docks are presently available which allow the user to output sound or music from a smartphone to an external speaker. Though effective, such peripherals generally utilize connectors such as the Iphone®'s 30-pin connector, in order to create and maintain a data connection. Designing and manufacturing peripherals which utilize these connectors entails significant costs, both from an engineering and licensing standpoint.

Such costs can be an impediment to bringing smartphone capabilities and functionality to low priced or low margin items such as toys. However, there are toys that could benefit from integration with smartphones, as the present inventors have recognized.

It is with respect to these considerations and others that the disclosure made herein is presented.

SUMMARY OF THE INVENTION

Technologies are presented herein for interfacing with a mobile device. According to one aspect, a method for interfacing one or more peripheral devices with a mobile device having a processor is provided. One or more unique tones/signals are generated at a respective peripheral device corresponding to an event detected by the respective peripheral device. The signals are conveyed to a mobile device where they are received through a microphone in communication with the mobile device. A processor processes the signals into one or more digital commands, and correlates the digital commands with real-time data to identify an action. One or more outputs are then provided based upon the action. According to another aspect, a system for interfacing one or more peripheral devices with a mobile device is provided. The system includes a processor, a control circuit operatively connected to the processor, a memory operatively connected to the control circuit and accessible by the processor, an interfacing module stored in the memory and executing in the processor, and a microphone operatively connected to the control circuit. When the interfacing module, is executed by the processor, it configures the control circuit to receive one or more signals with the microphone. Each of the signals originates at a respective peripheral device and corresponds to an event detected by the respective peripheral device. The processor processes the signals into one or more digital commands. The interfacing module executes so as to further configure the control circuit so as to correlate the digital commands with real-time data, using the processor, to identify an action and to provide one or more outputs based upon the action.

According to another aspect, a system for interfacing with a mobile device is provided. The mobile device includes a processor and a storage medium accessible by the processor. The system includes a signal generator that generates one or more signals, a signal conveyor connected to convey the signals to the mobile device, and one or more software modules encoded on the storage medium. When the storage modules are executed by the processor, they cause the system to process the signals into one or more digital commands, correlate the digital commands with real-time data to identify an action, and provide one or more outputs based upon the action.

According to yet another aspect, an apparatus for enhancing the operation of a launching device is provided. The launching device includes a trigger. The apparatus includes a housing supported by the launching device, a circuit board contained within the housing and having control circuitry, one or more speakers contained within the housing and connected to the circuit board, and a trigger sensor connected to the circuit board and oriented to be capable of engagement by the trigger. The circuit board and control circuitry function to maintain a tally of instances that the trigger sensor is engaged, provide a first audio feedback through the speakers in response to engagement of the trigger sensor, and provide a second audio feedback through the speakers in response to the tally of instances that the trigger sensor is engaged.

These and other aspects, features, and arrangements can be better appreciated from the accompanying description of the drawing figures of certain embodiments of the invention.

BRIEF DESCRIPTION OF THE DRAWINGS

FIGS. 7A and 7B provide various perspectives on one arrangement of a particular peripheral device as disclosed herein.

DETAILED DESCRIPTION OF CERTAIN EMBODIMENTS OF THE INVENTION

Figure 1:
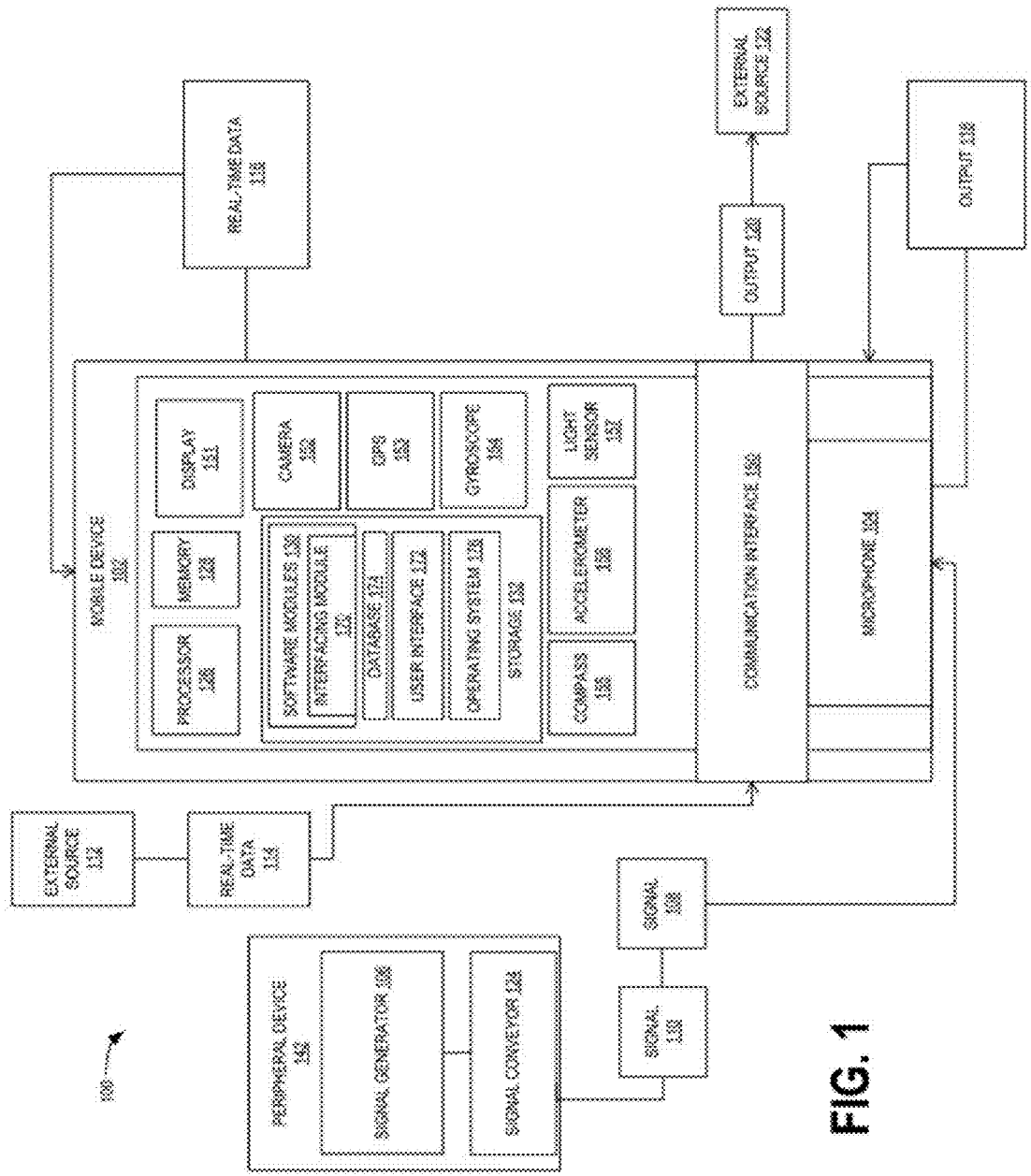
FIG. 1 is a high-level diagram illustrating an exemplary configuration of a mobile device having a microphone, a signal generator, a signal conveyor, and various external sources.

By way of overview and introduction, the present disclosure details systems and methods for interfacing a peripheral device such as a toy with a mobile device such as a smartphone. Significant benefits and previously unattainable results are achieved through the interfacing of various peripheral devices, including basketball hoops, shooting targets, and toy guns, with mobile devices such as smartphones executing one or more software modules or applications. For example, in one implementation of the present systems and methods, one or more peripheral devices (such as a specially-configured basketball hoop) can generate various signals and/or tones (such as tones corresponding to a made shot), and these signals/tones can subsequently be received by the microphone of a mobile device. The mobile device can process these signals/tones into digital commands that correspond to instances of scoring, and can further tally such commands to maintain a score of one or more players during a game or competition.

In an additional and further implementation of the systems and methods disclosed herein, a mobile device can correlate the digital commands (originating from the various signals/tones) with real-time data that is received by and/or perceptible to the mobile device. For example, a mobile device can further correlate the referenced digital commands (which correspond to signals/tones, as described above) with real-time data, such as an image and/or video captured by and/or otherwise perceptible to a camera integrated within the mobile device. In doing so, the mobile device can further provide enhanced services and experiences, such as the ability to implement a scoring scheme wherein shots (such as basketball shots) taken from various areas and/or regions are scored differently (such as two-point and three-point shots). By correlating a digital command (originating at a signal/tone that corresponds to a made basketball shot) with a real-time photographic capture of the player taking the shot from a specific region, the mobile device can provide enhanced scoring capabilities through the ability to determine which shots (and their corresponding signals/tones) should be scored as two-point shots, and which shots should be scored as three-point shots.

Various other applications and implementations of the present systems will be illustrated and further described herein.

The following detailed description is directed to systems and methods for interfacing a peripheral device with a mobile device. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.) or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

Referring now to the drawings, it is to be understood that like numerals represent like elements through the several figures, and that not all components and/or steps described and illustrated with reference to the figures are required for all embodiments or arrangements. FIG. 1 is a high-level diagram illustrating an exemplary configuration of a mobile device interface system 100. In one arrangement mobile device 102 can be a portable computing device such as a mobile phone, smartphone, or PDA. In other arrangements, mobile device 102 can be a tablet computer, a laptop computer, or a personal computer, though it should be understood that mobile device 102 of mobile device interface system 100 can be practically any computing device capable of embodying the systems and/or methods described herein.

Mobile device 102 of mobile device interface system 100 includes a control circuit 140 which is operatively connected to various hardware and software components that serve to enable operation of the mobile device interface system 100. The control circuit 140 is operatively connected to a processor 126 and a memory 128. Processor 126 serves to execute instructions for software that can be loaded into memory 128. Processor 126 can be a number of processors, a multi-processor core, or some other type of processor, depending on the particular implementation. Further, processor 126 can be implemented using a number of heterogeneous processor systems in which a main processor is present with secondary processors on a single chip. As another illustrative example, processor 126 can be a symmetric multi-processor system containing multiple processors of the same type.

Preferably, memory 128 and/or storage 132 are accessible by processor 126, thereby enabling processor 126 to receive and execute instructions stored on memory 128 and/or on storage 132. Memory 128 can be, for example, a random access memory (RAM) or any other suitable volatile or non-volatile computer readable storage medium. In addition, memory 128 can be fixed or removable. Storage 132 can take various forms, depending on the particular implementation. For example, storage 132 can contain one or more components or devices. For example, storage 132 can be a hard drive, a flash memory, a rewritable optical disk, a rewritable magnetic tape, or some combination of the above. Storage 132 also can be fixed or removable. For example, a removable hard drive can be used as storage 132.

One or more software modules 130 are encoded in storage 132 and/or in memory 128. The software modules 130 can comprise one or more software programs or applications having computer program code or a set of instructions executed in processor 126. Such computer program code or instructions for carrying out operations for aspects of the systems and methods disclosed herein can be written in any combination of one or more programming languages, including an object oriented programming language such as Java, Smalltalk, C++ or the like and conventional procedural programming languages, such as the "C" programming language or similar programming languages. The program code can execute entirely on the mobile device 102, partly on mobile device 102, as a stand-alone software package, partly on mobile device 102 and partly on a remote computer/device or entirely on the remote computer/device or server. In the latter scenario, the remote computer can be connected to mobile device 102 through any type of network, including a local area network (LAN) or a wide area network (WAN), or the connection can be made to an external computer (for example, through the Internet using an Internet Service Provider).

Software modules 130, including program code/instructions, are located in a functional form on one or more computer readable storage devices (such as memory 128 and/or storage 132) that can be selectively removable. The software modules 130 can be loaded onto or transferred to mobile 102 for execution by processor 126. It can also be said that the program code of software modules 130 and one or more computer readable storage devices (such as memory 128 and/or storage 132) form a computer program product.

It should be understood that in some illustrative embodiments, one or more of software modules 130 can be downloaded over a network to storage 132 from another device or system via communication interface 150 for use within mobile device interface system 100. For instance, program code stored in a computer readable storage device in a server can be downloaded over a network from the server to mobile device interface system 100.

Preferably, included among the software modules 130 is an interfacing module 170 that is executed by processor 126. During execution of the software modules 130, and specifically the interfacing module 170, the processor 126 configures the control circuit 140 to process various received signals into digital commands and further correlate the commands with real-time data, as will be described in greater detail below. It should be noted that while FIG. 1 depicts memory 128 oriented on control circuit 140, in an alternate arrangement, memory 128 can be operatively connected to the control circuit 140. Additionally, it should be understood that while FIG. 1 depicts processor 126 and memory 128 as discrete entities within mobile device 102, in certain arrangements memory 128 can be integrated as part of processor 126, such as in an integrated circuit (IC), as is well known to those of skill in the art. It should also be noted that other software modules (such as user interface 172 and operating system 176) and other information and/or data relevant to the operation of the present systems and methods (such as database 174) can also be stored on storage 132, as will be discussed in greater detail below. In addition, a display 151 (such as an LCD touchscreen) can also be operatively connected to control circuit 140. Processor 126 can execute operating system 176 (such as Apple's iOS or Google's Android) which in turn provides user interface 172 to display 151, thereby enabling a user to view and/or interact with mobile device 102 in a dynamic way.

A communication interface 150 is also operatively connected to control circuit 140. Communication interface 150 can be any interface that enables communication between the mobile device 105 and external devices, machines and/or elements. Preferably, communication interface 150 includes, but is not limited to, a modem, a Network Interface Card (NIC), an integrated network interface, a radio frequency transmitter/receiver, an infrared port, a USB connection, or any other such interfaces for connecting mobile device 102 to other devices. Such connections can include a wired connection or a wireless connection (e.g. 802.11) though it should be understood that communication interface 150 can be practically any interface that enables communication to/from the control circuit 140.

A microphone 104 is also preferably connected to and/or in communication with control circuit 140. Microphone 104 can include, but is not limited to, an internal microphone included as an existing element of the mobile device 102, a microphone input and/or adapter, a combined microphone/headphone input and/or adapter, and/or an external or auxiliary microphone connected and/or configured with the mobile device 102.

As illustrated in FIG. 1, in certain arrangements mobile device interface system 100 further includes one or more peripheral devices, such as peripheral device 142. Peripheral device 142 preferably includes a signal generator 106. In certain arrangements, signal generator 106 can be an electronic circuit that is capable of generating one or more audio-frequency analog signals, such as a microcontroller with a digital-analog-converter (DAC) output. It should therefore be understood that peripheral device 142 can, in certain arrangements, be structurally similar to mobile device 102, though it should be recognized that any device capable of generating such signals can also be a peripheral device 142 within mobile device interface system 100. Signal generator 106 is further configured and/or in communication with signal conveyor 124. In certain arrangements, signal conveyor 124 is preferably a speaker, a piezoelectric element, a vibrator, or any other such device capable of conveying and/or projecting one or more signals. In certain other arrangements, signal conveyor 124 can be a light source such as a light-emitting diode (LED) which can generate one or more unique visual signals 108, 110 that can be perceived and/or detected by camera 152 and/or light sensor 157. As such, it can be appreciated that while FIG. 1 depicts signals 108, 110 being received by microphone 104 of mobile device 102, in other arrangements signals 108, 110 can actually be received by practically any other component and/or element of mobile device 102, including but not limited to camera 152 and light sensor 157, as has just been described. Moreover, it should be appreciated that signals 108, 110 need not be the same type of signal. Thus, for example, in certain arrangements signal 108 can be a tone that is received by microphone 104 while signal 110 can be a visual signal that can be received by camera 152 and/or light sensor 157. It should be understood that in such an arrangement signal conveyor 124 preferably has the capacity to convey both audio tones and visual signals. It should also be noted that while signal generator 106 is depicted in FIG. 1 as being structurally independent of the mobile device 102 and microphone 104, in other arrangements the signal generator 106 can be an existing element of mobile device 102.

The signal generator 106 preferably generates one or more signals 108, 110. The signals 108, 110 are conveyed by the signal conveyor 124 to microphone 104. It should be appreciated that while in certain arrangements signal conveyor 124 can be a speaker, in other arrangements signal conveyor 124 can be a transducer or any other such conversion device. In yet other arrangements, the signal conveyor 124 can be a wire or connector capable of conveying the signals 108, 110 to microphone 104. The signals 108, 110 are preferably one or more tones (or a series of tones) which can be understood to be analog signals in the audio spectrum that can be detected by microphone 104 and which are preferably encoded with digital information, as will be described herein. As will be apparent to one of skill in the art, various modulation schemes can be utilized to implement the various tones/signals referenced herein, including but not limited to multiple frequency-shift keying (MFSK), on-off keying (OOK), frequency-shift keying (FSK), and amplitude-shift keying (ASK). As referenced above, it should be noted that in certain implementations, microphone 104 can take the form of a connector or adapter capable of receiving a microphone and/or analog signals. The signals 108, 110 can be generated by the signal generator 106 in response to any number of stimuli and/or events, as will be described in greater detail below. The signal generator 106, signal conveyor 124, and mobile device 102 are configured such that various distinct signals correspond to specific stimuli and/or events, as is also described in greater detail below.

Once the signal generator 106 has generated one or more signals 108, 110, the signal conveyor 124 conveys and/or projects the signals 108, 110 to microphone 104 of the mobile device 102. It should be noted that the signal generator 106 can generate signals in response to and/or as a result of any number of events, stimuli, and or inputs. By way of example, signal generator 106 of peripheral device 142 can generate one or more signals in response to the activation of a switch or trigger configured as part of a sporting goal (such as a basketball hoop), as will be described in greater detail below. By way of further example, the signal generator 106 can generate one or more signals in response to the push of a button operatively connected and/or in communication with the signal generator 106. By way of yet further example, the signal generator 106 can generate one or more signals in response to an alert or notification. Each event, stimulus, and/or notification preferably corresponds to a unique signal or series of signals.

At this juncture it should be noted that in certain arrangements signals 108, 110 can be audio tones, preferably in the frequency range of 15 kHz-20 kHz, though it should be understood that tones of practically any frequency (such as ultrasonic tones) can be used as well. Tones in the range of 15 kHz-20 kHz, though capable of being received and/or detected by microphone 104, are generally inaudible or minimally audible to many humans. As such, tones within this range can be preferable in situations where it is desirable to have a signal transmitted to mobile device 102 without unnecessarily projecting a tone that may disturb others nearby. In other arrangements, signals 108, 110 can be visual signals, such as flashing or flickering lights. (It can be appreciated that in such an arrangement signal generator 106 and signal conveyor 124 can correspond to appropriate lighting and/or flashing devices such as lights or flashes capable of generating the appropriate visual signals. Moreover, in such an arrangement the visual signals are preferably received and/or detected by a visual detection device integrated within and/or in communication with mobile device 102 such as an integrated camera 152 and/or light sensor 157.) In yet further arrangements, signals 108, 110 can be data signals, such as messages and/or notifications. In such an arrangement, signal generator 106 and conveyor 124 can transmit one or more messages and/or notifications (signals 108, 110) that can be received by mobile device 102.

Upon receiving the conveyed signals 108, 110 at microphone 104, the mobile device 102 utilizes its processor 126 in conjunction with interfacing module 170 to process the signals 108, 110 into digital commands. According to one arrangement, the processor 126 executes code such as can be included in one or more software modules 130 stored in the mobile device's memory 128 and/or storage 132 to process the signals 108, 110. By way of example, the processor 126 can process signals associated with the activation of a sporting goal and/or the pressing of a button or key into commands for a video game.

Concurrent with the generating, conveying, and processing of the signals 108, 110, in certain arrangements the mobile device 102 is in receipt of real-time data 114, 116. The real time data can originate at a source 112 external to the mobile device 102. By way of example, another mobile device (depicted in FIG. 1 as external source 112) can transmit its present location to mobile device 102 (depicted in FIG. 1 as real-time data 114). According to another arrangement, the mobile device 102 itself can generate real time data 116. By way of example, mobile device 102 can utilize an integrated camera 152 to detect and capture a real-time display of the mobile device's surroundings. By way of further example, mobile device 102 can utilize an integrated GPS sensor or receiver 153 to determine the device's global location in real-time. By way of yet a further example, mobile device 102 can utilize an integrated gyroscope 154 to determine the device's orientation and relative motion. In other examples, mobile device 102 can utilize an integrated compass 155 to determine the direction of the mobile device 102 and/or an integrated accelerometer 156 to determine changes in the acceleration of the mobile device 102. According to yet another arrangement, the mobile device 102 can be in receipt of real time data originating from both external sources 114, as well as from the mobile device itself 116, (substantially) simultaneously.

At this juncture, it should be noted that the referenced real time data 114, 116 can comprise any number of formats. By way of example, real time data 114, 116 can be a notification or message. By way of further example, real time data 114, 116 can be one or more location coordinates. In addition, although real-time data 114 is shown in FIG. 1 as being transmitted to and/or received by communication interface 150, it should be appreciated that real time data 114 (in addition to real-time data 116) can pertain to any number of elements and/or components of mobile device 102, including but not limited to user interface 172. For example, as will be described in greater detail below, real-time data 114 can be a notification indicating that a competitor playing a game at another mobile device (external source 112) has scored a basket. This real-time data 114 can be received at communication device 150 and in turn depicted graphically at user interface 172 (as presented at display 151) by incrementing a live scoreboard that tracks the scores of one or more players in real-time during a game or competition.

Upon receiving one or more signals 108, 110, and one or more pieces of real-time data 114, 116, mobile device 102 utilizes its processor 126 in conjunction with the execution of one or more stored software modules 130 (including interfacing module 170) to correlate the digital commands with the real-time data in order to identify an action. By way of example, the processor 126 executing software modules 130 can correlate a digital command originating from the activation of a sporting goal (such as the triggering of a shot counter configured with a basketball hoop) with real time data 116 gathered from camera 152 that is integrated within and/or in communication with mobile device 102. Being that camera 152 can be configured to capture and/or detect the location in a given space from which a user took a basketball shot (real-time data 116), this data can be correlated with one or more digital commands originating at peripheral device 142 (that is, the sporting goal that generates and conveys a unique signal when a shot is made). By correlating the real-time data from camera 152 with the digital commands originating at the sporting goal (peripheral device 142), the processor 126 in conjunction with the software modules 130 can identify an action, such as that a two-point shot was made (if the real-time data from camera 152 indicates that the shot was taken from a two-point area), or that a three-point shot was made (if the real-time data from camera 152 indicates that the shot was taken from a three-point area).

An additional dimension can be achieved when further correlating real-time data 114 originating at external source 112 with the one or more digital commands originating at peripheral device 142 and real time data 116 that originates at mobile device itself (such as from camera 152). Building on the example illustrated above (pertaining to the correlation of a digital command with real-time data from camera 152 to identify that a two- or three-point shot was made), mobile device 102 can be further in communication with an external mobile device, such as through a network or internet connection (established and/or maintained through communication interface 150), as is well known to those of skill in the art. External mobile device (depicted in FIG. 1 as external source 112) is preferably a mobile device similar to mobile device 102 that is similarly configured with a comparable peripheral device 142 at a remote location. Thus, by utilizing the network/internet connection between external source 112 (here, the external mobile device) and mobile device 102, two players at remote locations can engage in head-to-head, real-time gameplay. For example, a player at mobile device 102 and a player at an external mobile device (external source 112) (or any number of additional players/devices) can engage in any number of real-time games, for example, competing to see which player can score 10 three-point shots first. In such a scenario, external mobile device (external source 112) can transmit, and mobile device 102 can receive one or more messages and/or notifications (depicted in FIG. 1 as real-time data 114), each of which reflect an incidence of scoring (or any other such event) detected by the external mobile device (external source 112), preferably in response to a detection of a signal by the external mobile device, the processing of such a signal into a digital command, and the correlation of the digital command with real-time data perceived by the external mobile device, substantially in the manner described in detail herein (thereby recognizing, for instance, whether the player utilizing the external mobile device has scored a two-point or three-point shot). In doing so, upon receiving real-time data 114 (here, a notification that the player at the external mobile device has scored a three-point shot), this real-time data 114 can be further correlated at mobile device 102 with the digital command(s) and real-time data 116 referenced above (for instance, pertaining to the scoring of a three-point shot by the user of mobile device 102), in order to determine (such as in conjunction with interfacing module 170) which player scored a certain number of three-point shots first.

By way of further example, the processor 126 executing the software module(s) 130 can correlate a digital command originating from the pressing of the trigger of a toy gun with real-time data gathered from the mobile device's 102 camera 152 (which can visually depict the target of the toy gun's 'shot') or from the mobile device's 102 compass 155 (which can indicate the direction which the player was facing at the time of the shot). In doing so, the processor 126 executing the software module(s) 130 is able to identify an action, such as 'hit target' or 'missed target.' By analyzing the content of the image captured by the device's camera 152 at the time that the trigger was engaged or the direction provided by the compass 155 at that time, the processor 126 executing the software module(s) 130 can determine (based on the image and/or the direction) if a target was hit or missed.

Figure 7B:
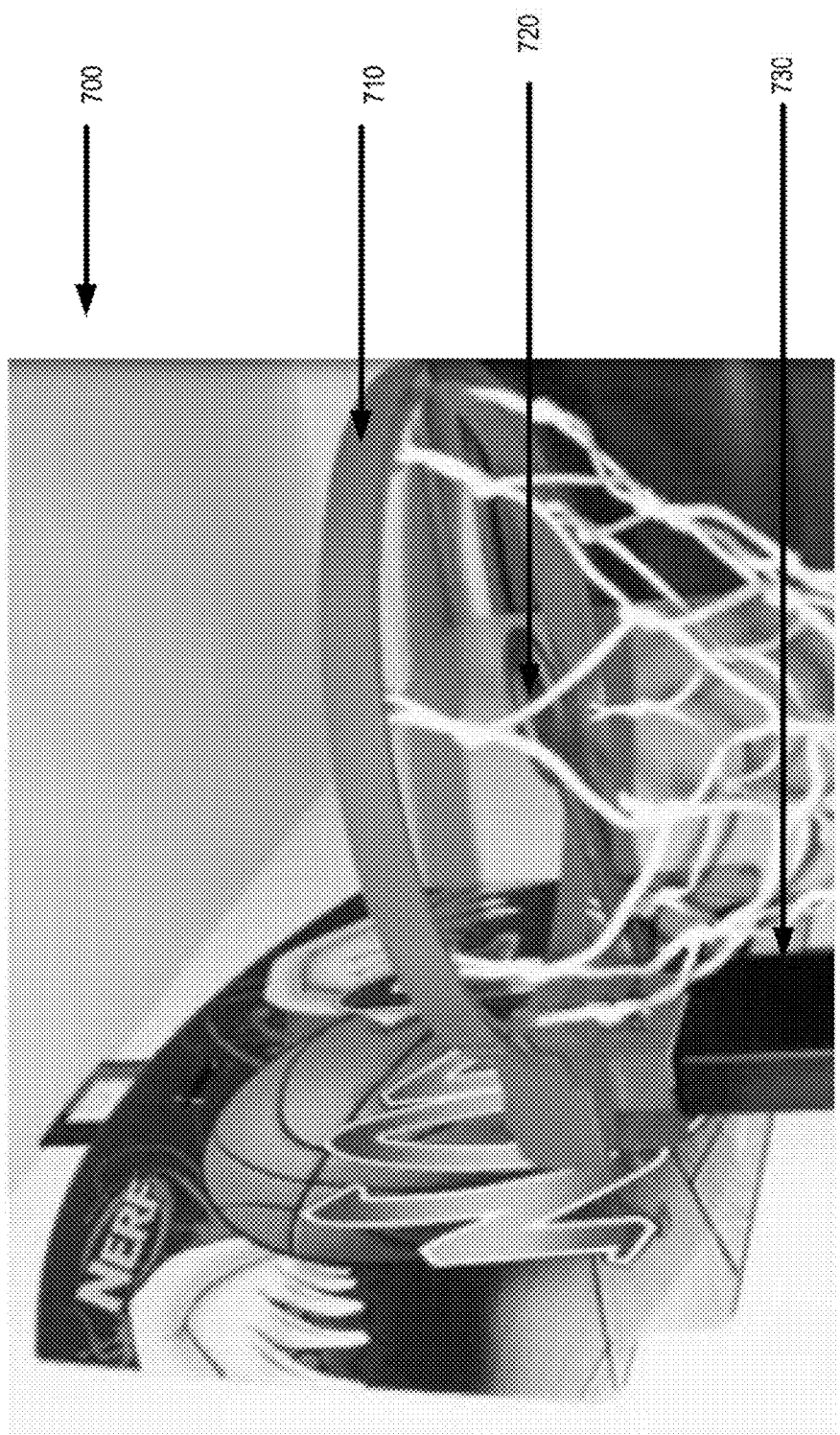

FIGS. 7A and 7B provide various perspectives on one arrangement of peripheral device 142. As depicted in FIGS. 7A and 7B, peripheral device 142 can be a specially configured sporting goal such as a basketball hoop 700, though it should be understood that various other goals can be similarly configured, such as a soccer goal. Basketball hoop 700 preferably includes a hoop or goal 710, as is well known to those of skill in the art. Also preferably included are a trigger and/or switch 720 that is oriented in the manner depicted in FIGS. 7A and 7B such that the trigger 720 is triggered and/or activated when a ball passes through hoop 710. In addition, a signal generator 106 and/or signal conveyor 124 are preferably incorporated into an enclosure 730 which serves to generate and convey various signals upon the activation of trigger/switch 720, thereby indicating that a shot has been made. Accordingly, it can be appreciated that two (or more) such basketball hoops 700 can be arranged such that they can provide a setting for simultaneous competitive gameplay between two or more players. Being that each basketball hoop 700 can be configured to generate and/or convey a unique signal/tone to indicate that a shot has been made at that particular basket, a basketball scoring application, such as the one depicted in FIG. 8 and described in detail below, can maintain an accurate tally of the scoring of each of the one or more basketball hoops 700 in furtherance of a basketball game or competition.

At this juncture it should be understood that while in certain arrangements trigger/switch 720 and/or enclosure 730 are integrated with hoop 710 such that they are provided as a single assembly, in other arrangements trigger/switch 720 and/or enclosure 730 can be independent, stand-alone items that can be attached and/or configured to existing conventional hoops 710, thereby resulting in the specially configured sporting goal disclosed herein.

Figure 8:
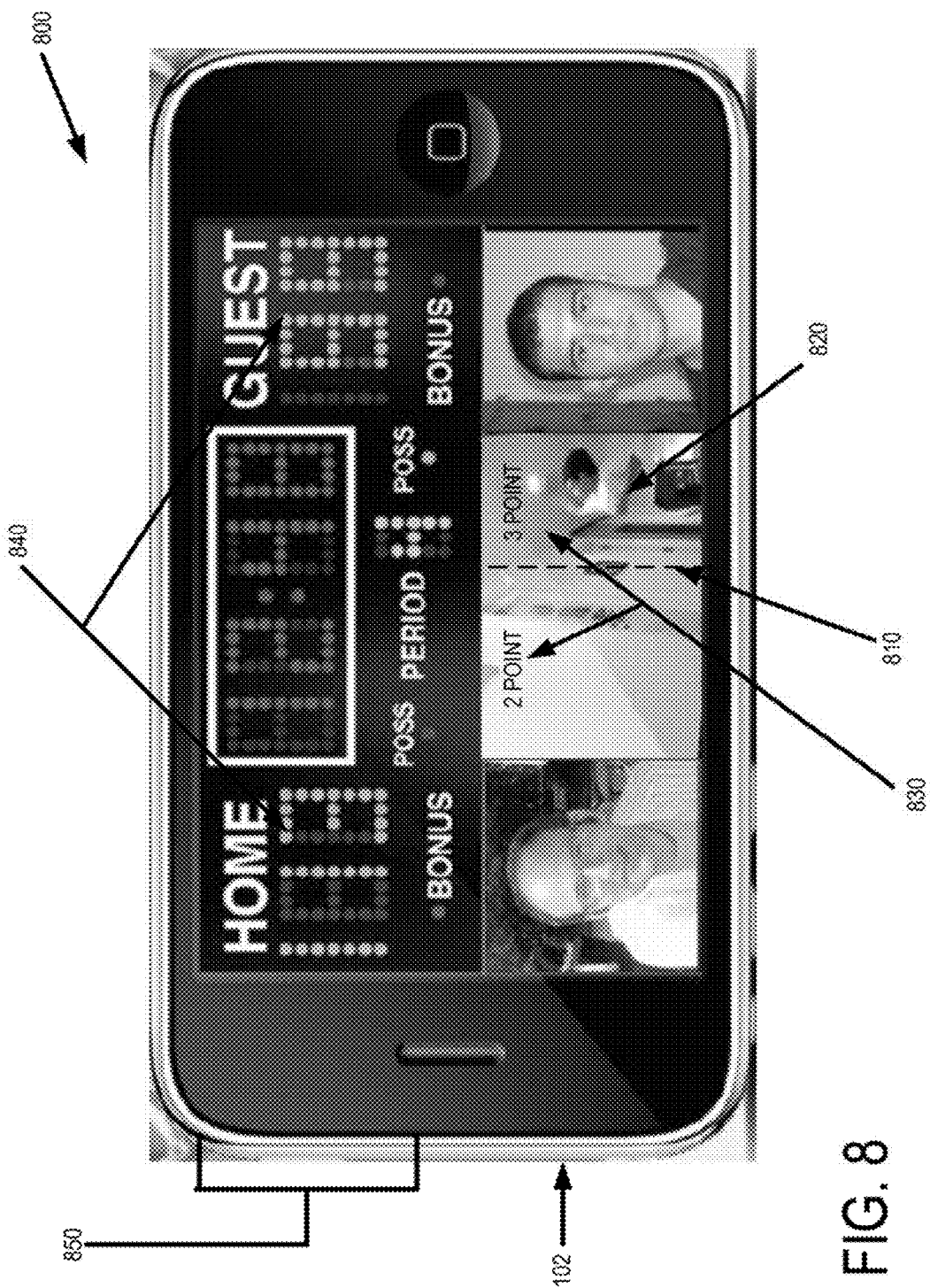
FIG. 8 depicts a screenshot of a basketball scoring application that illustrates the identification of one or more actions based upon the correlation of one or more digital commands with one or more pieces of real-time data.

FIG. 8 depicts a screenshot 800 of a basketball scoring application that further illustrates the identifying of one or more actions based upon the correlation of one or more digital commands with one or more pieces of real-time data, as described above. As depicted in FIG. 8, camera 152 can capture one or more real-time images 810 which can depict a user 820 taking a basketball shot in one of any number of regions 830. By correlating this real-time data with one or more digital commands originating at a peripheral device 142 (such as basketball hoop 700, where the commands correspond to a shot being made), device 102 in conjunction with software modules 130 can maintain one or more scores 840 during a basketball game. More specifically, when receiving a digital command (originating at a signal from the enclosure 730 of basketball hoop 700), the mobile device 102 can correlate this command with the real-time image received and/or captured by camera 152, thereby determining if the shot should be scored as a two point shot or a three point shot. The change in the user's respective score 840 can then be processed accordingly.

It should also be noted that one or more of the software modules 130 can enable a user to define one or more such areas and/or regions that are perceptible to mobile device 102, such as through camera 152. To do so, the user can position mobile device 102 such that a certain area and/or region is viewable through camera 152. The user can then define, such as through a visual interface, one or more scoring regions, such as a two-point area and a three-point area, as depicted in FIG. 8. In doing so, the user can customize the parameters and/or degree of difficulty of a particular game, and can further ensure that the scoring scheme is appropriate for the particular area within which the game is being played. Alternatively, the user can place one or more objects such as markers within the field of view which is identifiable to one of the software modules 130 as boundaries that define the in-play/out-of-bounds regions, as well as 2-point/3-point boundaries, and so on.

Figure 10:
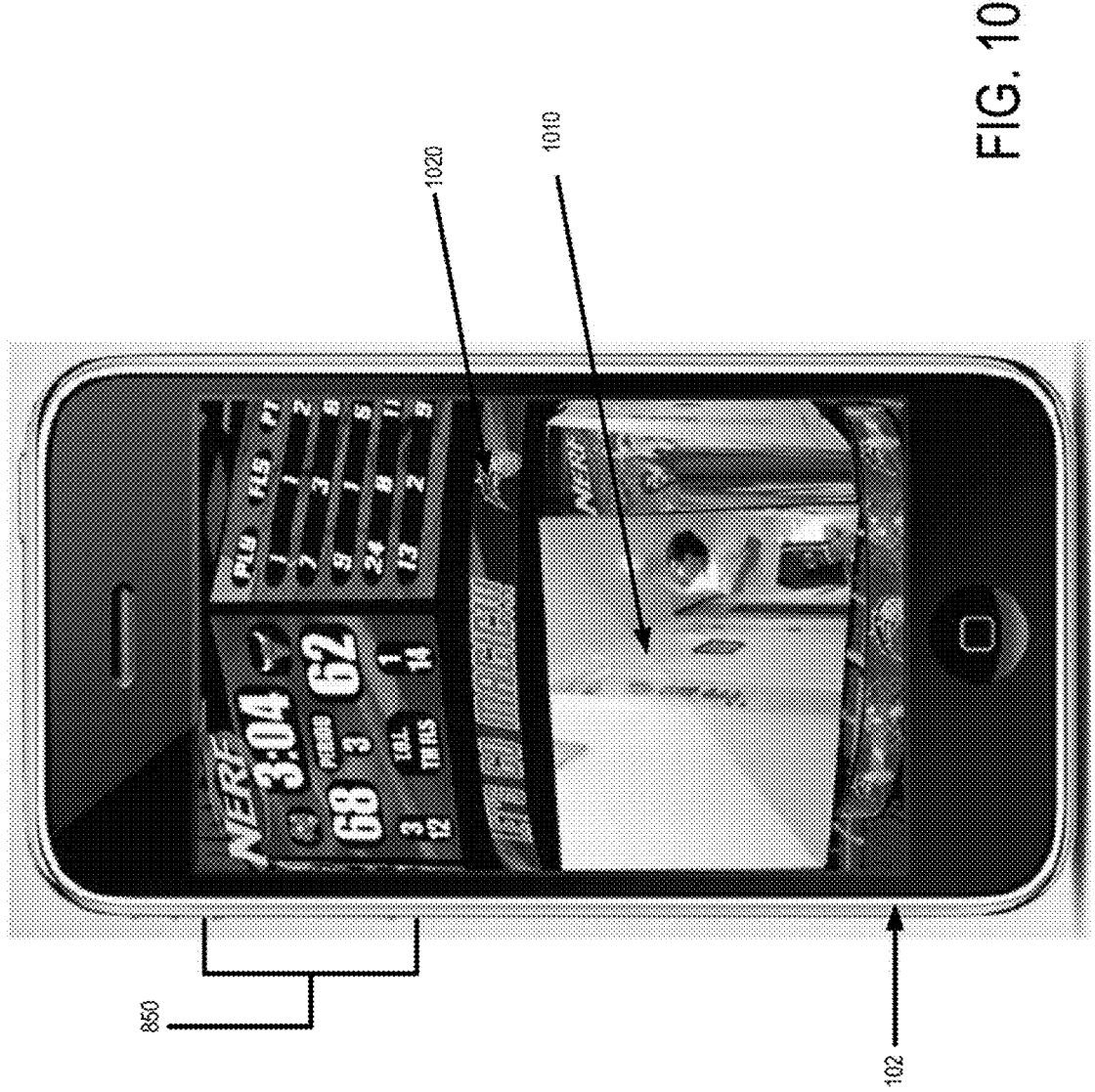
FIG. 10 depicts a screenshot of a video recording module that can be enhanced through the identification of one or more actions based upon the correlation of one or more digital commands with one or more pieces of real-time data, as disclosed herein.

In yet another example, depicted in FIG. 10, a video recording module can be enhanced through the identification of one or more actions based upon the correlation of one or more digital commands with one or more pieces of real-time data, as described above. A generic video recording module (among software modules 130) executing at mobile device 102 can be activated and/or set to capture and/or record various events such as sports gameplay, as is well known to those of skill in the art. During the course of recording such gameplay, mobile device 102 can receive one or more signals 108, 110 through microphone 104, as described above. The signals 108, 110 preferably correspond to various gameplay events, such as the triggering of a trigger or switch configured with a sports goal as shown in connection with the basketball hoop 700 example depicted in FIGS. 7A and 7B. Thus, the signals 108, 110 can correspond to gameplay events such as the making of a basketball shot. Accordingly, while a video recording module is recording/capturing gameplay video 1010 (and/or gameplay images) at mobile device 102, signals 108, 110 can be received by microphone 104 (signifying that a shot was made), and these signals can be processed into digital commands, as described herein. These digital commands (corresponding to a made basketball shot) can then be received and/or perceived by video recording module, and various additional effects 1020 (e.g., the sound of crowd cheering, a 'SCORE' graphic, and/or an updating scoreboard 850) can be embedded within and/or upon the video generated by the video recording module. In doing so, a video recording module executing at mobile device 102 can be enhanced through the identifying of one or more actions based upon the correlation of one or more digital commands with one or more pieces of real-time data, as described above.

Figure 9:
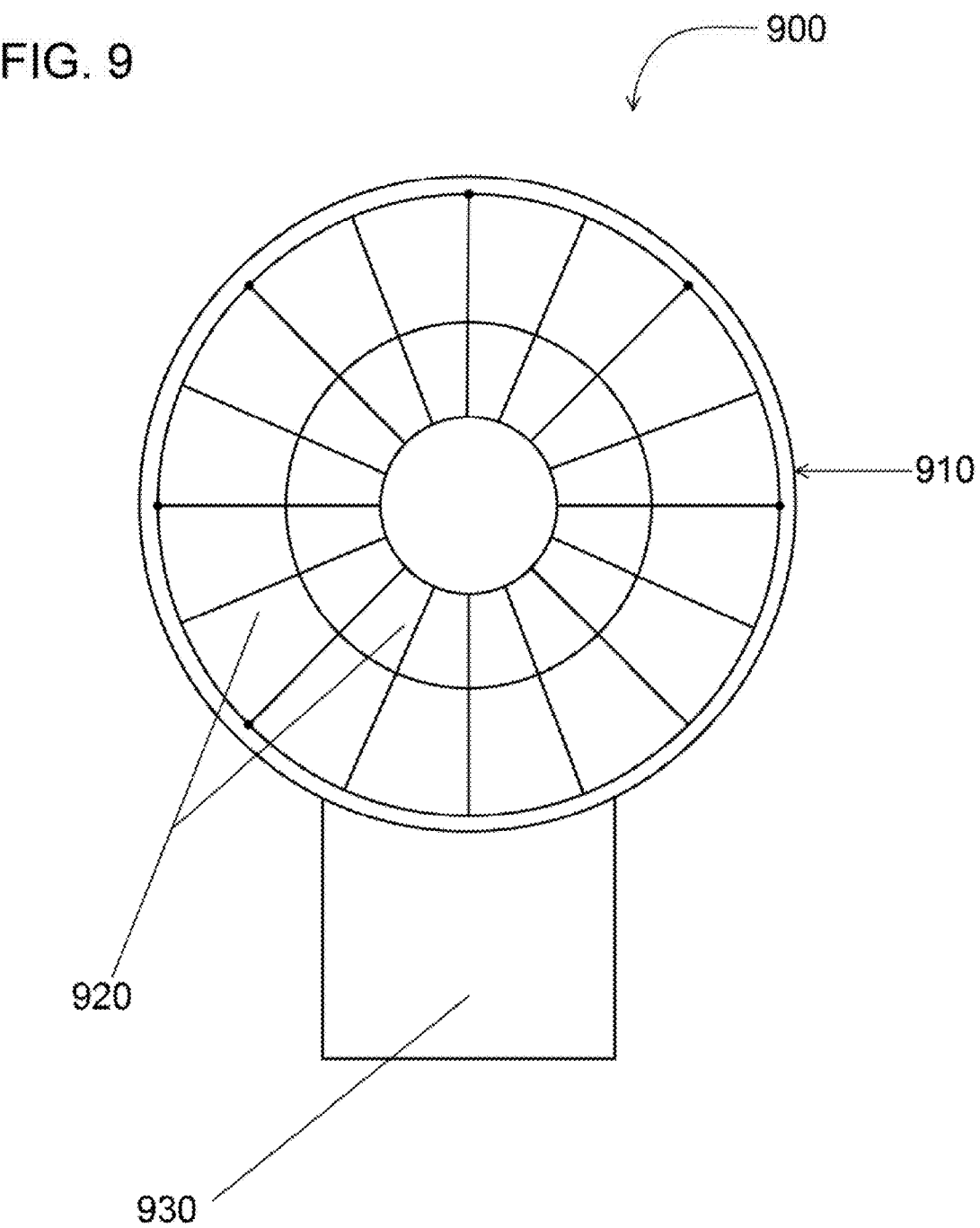
FIG. 9 depicts an alternative arrangement of a peripheral device as disclosed herein.

By way of further example, FIG. 9 depicts a specially configured dartboard 900. The dartboard 900 preferably includes a dartboard surface 910 having one or more target regions 920. An enclosure 930 containing a signal generator 106 and/or signal conveyor 124 is preferably affixed to dartboard surface 910. When a user strikes one or more of the various regions 920, enclosure 930 can emit one or more unique signals corresponding to the region 920 that was struck, such as in response to a pressure-sensitive sensor, as is well known to those of skill in the art. These signals can then be received at mobile phone 102 which can execute one or more software modules 130 that can serve to maintain one or more scores during a dart game. The mobile phone 102 can thus determine the number of points to award to a user based on the unique signal it receives from dartboard 900 that corresponds to the impact of a dart at a particular region of the dartboard.

Figure 6:
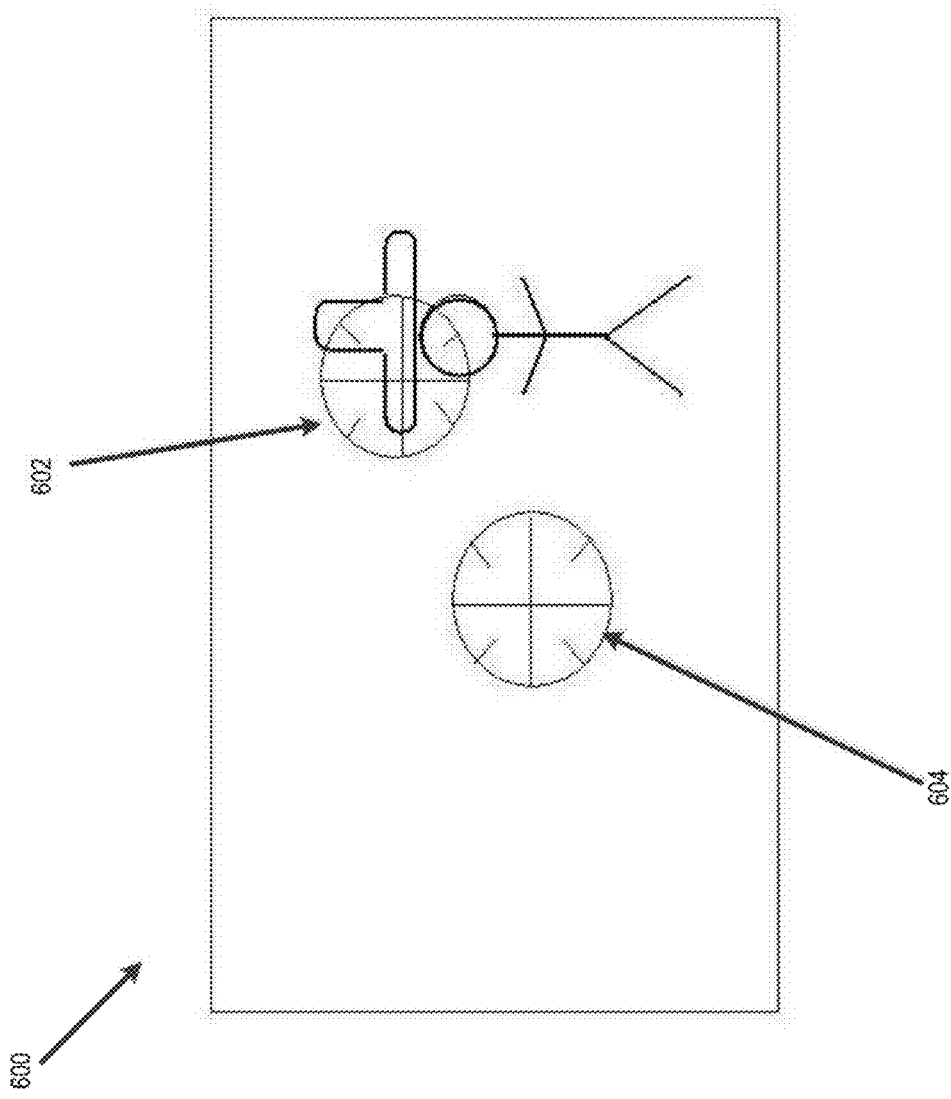
FIG. 6 depicts an exemplary screenshot of a video game reflecting one or more actions identified based upon the correlation of one or more digital commands with one or more pieces of real-time data.

By way of further illustration, FIG. 6 depicts an exemplary screenshot 600 of a video game further reflecting the identifying of one or more actions based upon the correlation of one or more digital commands with one or more pieces of real-time data, as described in detail above. The screenshot 600 presents a real-time view of the mobile device's 102 surroundings as captured through the mobile device's 102 integrated and/or connected camera 152. Superimposed upon the camera's view are one or more virtual reticles 602, 604 that correspond to the aim of a virtual gun. When the trigger of a toy gun is engaged (as will be described in greater detail below), the processor 126 executing the software module(s) 130 correlates the 'shot' command with the real-time visual data from the mobile device's 102 integrated/connected camera 152 to identify an action, such as whether the target has been hit 602 or missed 604.

According to another arrangement, the processor 126 executing the software module(s) 130 can correlate a digital command originating from the pressing of a trigger or button with real-time data gathered from concurrently executing software modules. By way of example, the processor 126 executing the software module(s) 130 can correlate a digital command originating from the pressing of the trigger of a toy gun with real-time data gathered from a single or multi-player video game executing concurrently on the mobile device 102. In doing so, the processor 126 executing the software module(s) 130 is able to identify an action, such as 'hit target' or 'missed target.' By analyzing the content of the image generated by the video game at the time that the trigger was engaged, the processor 126 executing the software module(s) 130 can determine if a virtual target (such as an enemy in a video game) was hit or missed.

Once the digital command(s) have been correlated with real-time data 114, 116 to identify an action, the processor 126 further provides one or more outputs 118, 120 based upon the action. The processor 126 can provide an output 118 to one or more elements of the mobile device 102 itself. By way of example, the processor 126 can provide a visual output to the mobile device 102 screen or display (not pictured), reflecting the 'hit target' or 'missed target' actions referenced above. In another implementation, the processor 126 can provide an output 120 to an external source 122. By way of example, the processor 126 can provide an output 120 such as an alert or notification to be transmitted to another mobile device 122 through communication interface 150, such as in support of multiplayer/multi-person activities.

It should be noted that additional features and functionalities are also present within the context of the various methods and systems described herein. For example, the mobile device 102 can utilize its integrated camera 152 to detect and/or capture images. In one arrangement, the mobile device 102 can utilize its processor 126 to execute one or more software modules 130 to analyze a detected and/or captured image in order to identify an embedded code or sequence (such as a bar code). The processor 126, in executing the software, can then determine one or more actions associated with the detected code or sequence. By way of example, mobile device's 102 camera 152 can detect or capture a bar code on a trading card associated with a particular video game. The bar code provides instructions to the video game, such as rewarding a player with a new weapon or skill within the context of the game. Furthermore, the player can elect to 'release' or 'reset' a given card, enabling the reward to be applied to another player upon a future detection of the barcode. Such release permits trading of the trading cards while supporting controlled rights management. Preferably, the card can be seated relative to the camera in a position that enables reading without requiring image recognition processes.

Additionally, the mobile device 102 may utilize its integrated camera 152 to detect and/or capture images to provide yet further functionality. In one arrangement, the mobile device 102 can utilize its processor 126 to execute one or more software modules 130 to analyze a detected and/or captured image in order to identify a specific image or pattern. The processor 126, in executing the software 130, further operates to perform image recognition and can then determine one or more actions associated with the detected image or pattern. By way of example, the mobile device's 102 camera 152 can detect or capture an image or pattern on a poster or graphic associated with a particular video game. The software modules 130 are configured to associate specific images or patterns with defined scenarios and/or events (such as a particular game, a level, or a round of a video game). In certain arrangements, video game play can be coordinated to focus around a specific image (such as a game where various enemies emanate from a certain poster). In doing so, the mobile device 102 can enhance the game play of a video game by correlating events and aspects of video gameplay with tangible, real-world items, locations, and events in connection with an immersive or augmented reality game.

It should be further understood that while the forgoing description has generally referred to signal generator 106 as being an element of a peripheral device 142 (that is, a device peripheral to mobile device 102), in certain arrangements mobile device 102 itself can function as the signal generator 106. In such arrangements, mobile device 102 can generate and/or play an audio file or tone that can be conveyed through microphone 104 (such as in the case of a combined microphone/headphone input and/or adapter) to a signal conveyor 124, such as a speaker, which can be configured as a peripheral device.

The operation of the mobile device interface system 100 and the various elements described above will be further appreciated with reference to the method interfacing with a mobile device as described below, in conjunction with FIG. 2.

Figure 2:
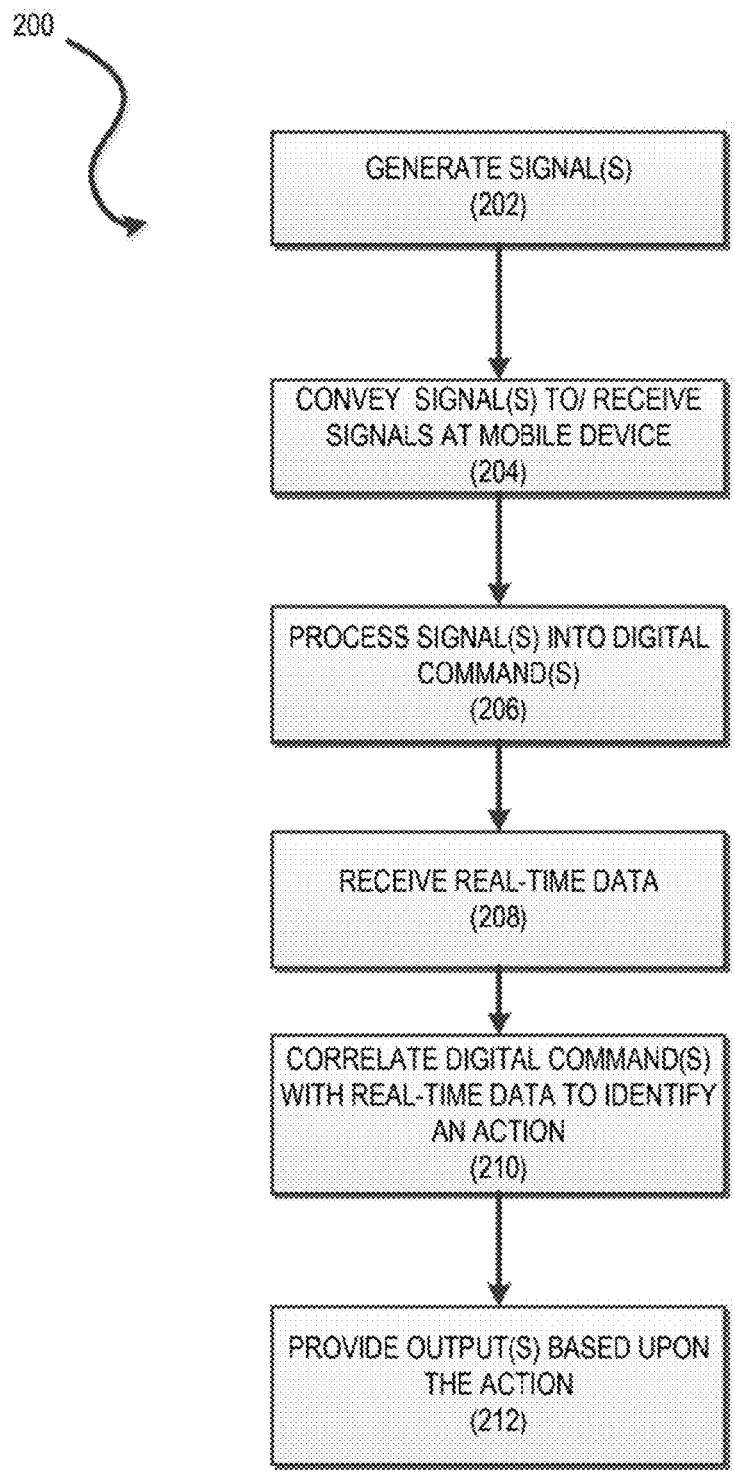
FIG. 2 is a flow diagram illustrating a method for interfacing with a mobile device, in accordance with exemplary embodiments thereof.

Turning now to FIG. 2, a flow diagram is described showing a routine 200 that illustrates a broad aspect of a method for interfacing with a mobile device in accordance with at least one embodiment disclosed herein. It should be appreciated that several of the logical operations described herein are implemented (1) as a sequence of computer implemented acts or program modules running on mobile device interface system 100 and/or (2) as interconnected machine logic circuits or circuit modules within the mobile device interface system 100. The implementation is a matter of choice dependent on the requirements of the device (e.g., size, energy, consumption, performance, etc.). Accordingly, the logical operations described herein are referred to variously as operations, structural devices, acts, or modules. Various of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The routine 200 begins at block 202 where the signal generator 106 generates one or more signals 108, 110, as described in detail above. The signals 108, 110 are preferably one or more tones or a series of tones which can be detected by microphone 104. It should be noted that the signals 108, 110 can be generated by the signal generator 106 in response to any number of stimuli, events, and/or inputs, such as the triggering of a switch, the push of a button or the receipt of an alert. Furthermore, each event, stimulus, and/or notification preferably corresponds to a unique signal or series of signals. As one example, the signals 108, 110 are generated by activating trigger/switch 720 (FIGS. 7A and 7B), and/or pressing one of buttons 312 (FIG. 3) or a trigger 304 (FIG. 4).

From operation 202, the routine 200 can proceed to operation 204, where the signal conveyor 124 conveys the signals 108, 110 to, and the signals 108, 110 are received at microphone 104 of mobile device 102. As described above, in various embodiments the signal conveyor can be a transducer (or any other such conversion device), a speaker, a wire, and/or a connector capable of conveying the signals 108, 110. The signal conveyor 124 preferably conveys the signals 108, 110 to microphone 104 of the mobile device 102, as described above.

From operation 204, the routine 200 can proceed to operation 206, where the mobile device's 102 processor 126 processes the received signals 108, 110 into digital commands. In one embodiment, the processor 126 executes code such as can be included in one or more software modules 130 stored in the mobile device's memory 128 and/or storage 132 to process the signals 108, 110. For example, the processor 126 can process signals associated with the pressing of a button, key, or trigger into commands for a traditional or augmented-reality (combining aspects of the real world with virtual effects) video game.

From operation 206, the routine 200 can proceed to operation 208, where the mobile device receives real-time data 114, 116. As described in detail above, the real time data can originate at a source 112 external to the mobile device 102 (such as another mobile device in direct or indirect communication with mobile device 102). Additionally, the mobile device 102 itself can generate real time data 116 (such as through the utilization of the mobile device's 102 integrated camera 152, GPS 153, and/or gyroscope 154, as described in detail above).

Upon receiving the real-time data at operation 208, the routine 200 can proceed to operation 210, where the processor 126 correlates the digital commands with real-time data 114, 116 to identify an action. In doing so, the processor 126 in conjunction with the execution of one or more stored software modules 130 correlates the digital commands (such as those generated as a result of the activation of a trigger/switch of a specially configured basketball hoop or the pressing of the trigger of a toy gun) with real-time data (such as data gathered from the mobile device's 102 integrated camera 152, such as in image and/or detection of a user taking a shot from a specific area, or depicting the gun's target) in order to identify an action (such as 'scored a two-point shot,' 'scored a three-point shot,' 'hit target,' or 'missed target.'), as described in detail above.

From operation 210, the routine 200 can proceed to operation 212 where outputs 118, 120 are provided based upon the action. The processor can provide an output 118 to one or more elements or components of the mobile device 102 itself (such as providing a visual output to the mobile device's 102 screen or display), or can provide an output 120 to an external source 122 (such as an alert or notification to be transmitted to another mobile device 122 through the mobile device's 102 communication means).

It should be noted that the flow shown in FIG. 2 is exemplary and the blocks can be implemented in a different sequence in variations within the scope of the invention.

Figure 3:
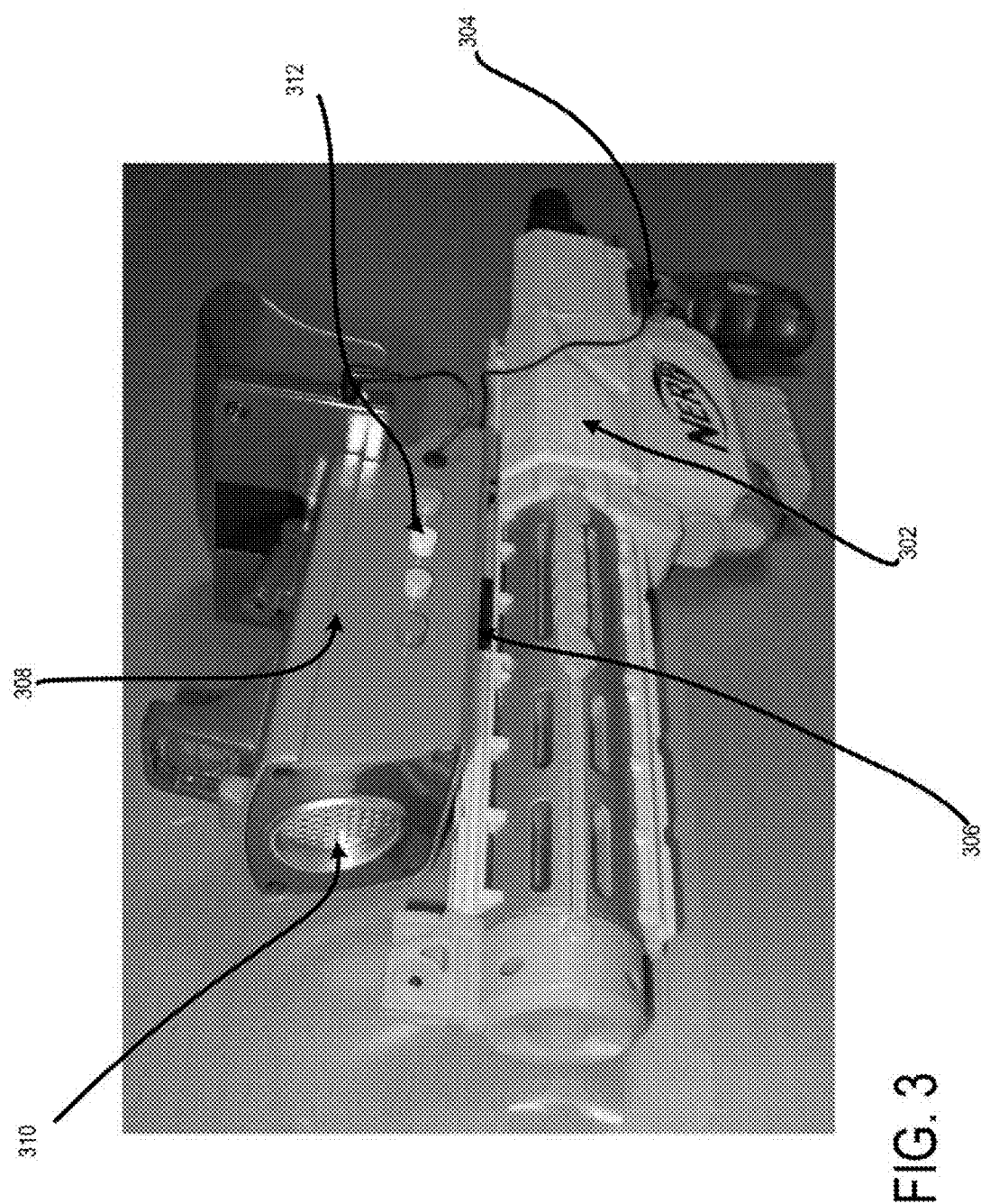
FIG. 3 is a perspective view of a launching device and a housing supported by the device according to various embodiments presented herein.
Figure 4:
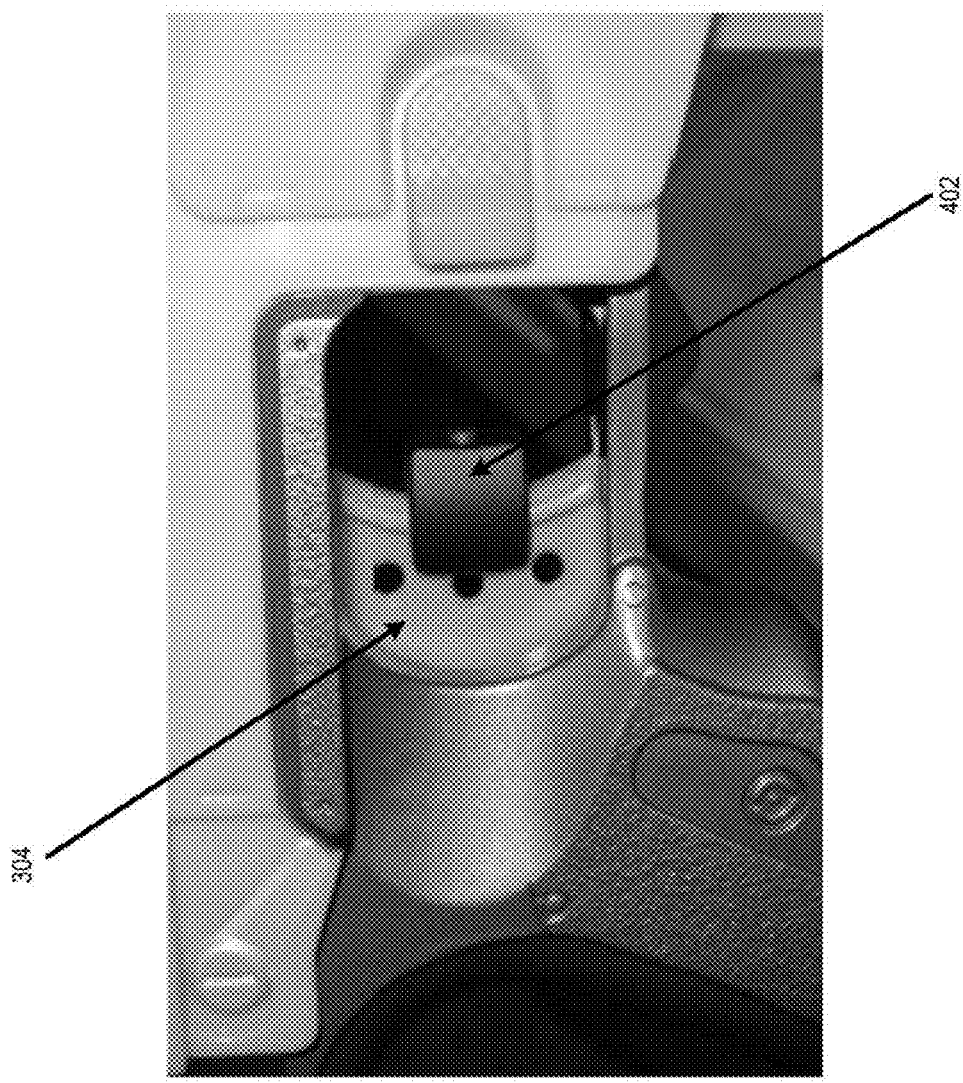
FIG. 4 is a close-up view of a trigger and a trigger sensor according to various embodiments presented herein.

Turning now to FIG. 3, an exemplary launching device and a housing supported by the device is described. The launching device 302 as shown is preferably a toy gun or any other such device having a trigger 304. A housing 308 can be supported by launching device 302. The housing 308 contains one or more speakers 310 which enable audio feedback in response to various events, as will be described in greater detail below. One or more buttons 312 are mounted to the housing, as will also be described in detail below.

In one arrangement, the launching device 302 includes a rail 306. In such an embodiment, the housing 308 includes a sled (hidden from view in FIG. 3) that engages the rail 306 and supports the housing 308. The sled is slidably moveable along the rail 306 to provide access to a clip holding darts or rockets. In other arrangements, the housing 308 is integral to the launching device 302.

FIG. 4 presents a close-up view of a trigger 304 and a trigger sensor 402 according to one arrangement presented herein. The trigger sensor 402 is preferably oriented such that it can be engaged upon the firing of the trigger 304. As depicted in FIG. 4, the trigger sensor 402 can be mounted upon the trigger 304, thereby necessitating engagement of the trigger sensor 402 upon firing of the trigger 304. The trigger sensor 402 can also include a button and/or a touch sensor to further enhance the sensitivity and accuracy of trigger sensor 402. In other arrangements, the trigger sensor 402 can be mounted elsewhere, such as behind the trigger 304 or so as to engage a hole in the trigger so as to move therewith. In certain other arrangements, trigger 304 and/or launching device 302 can be configured such that the functionality of trigger sensor 402 is incorporated within their respective structures and/or features. It can be appreciated that in such an arrangement, a structurally separate trigger sensor 402 with not be necessary.

Figure 5:
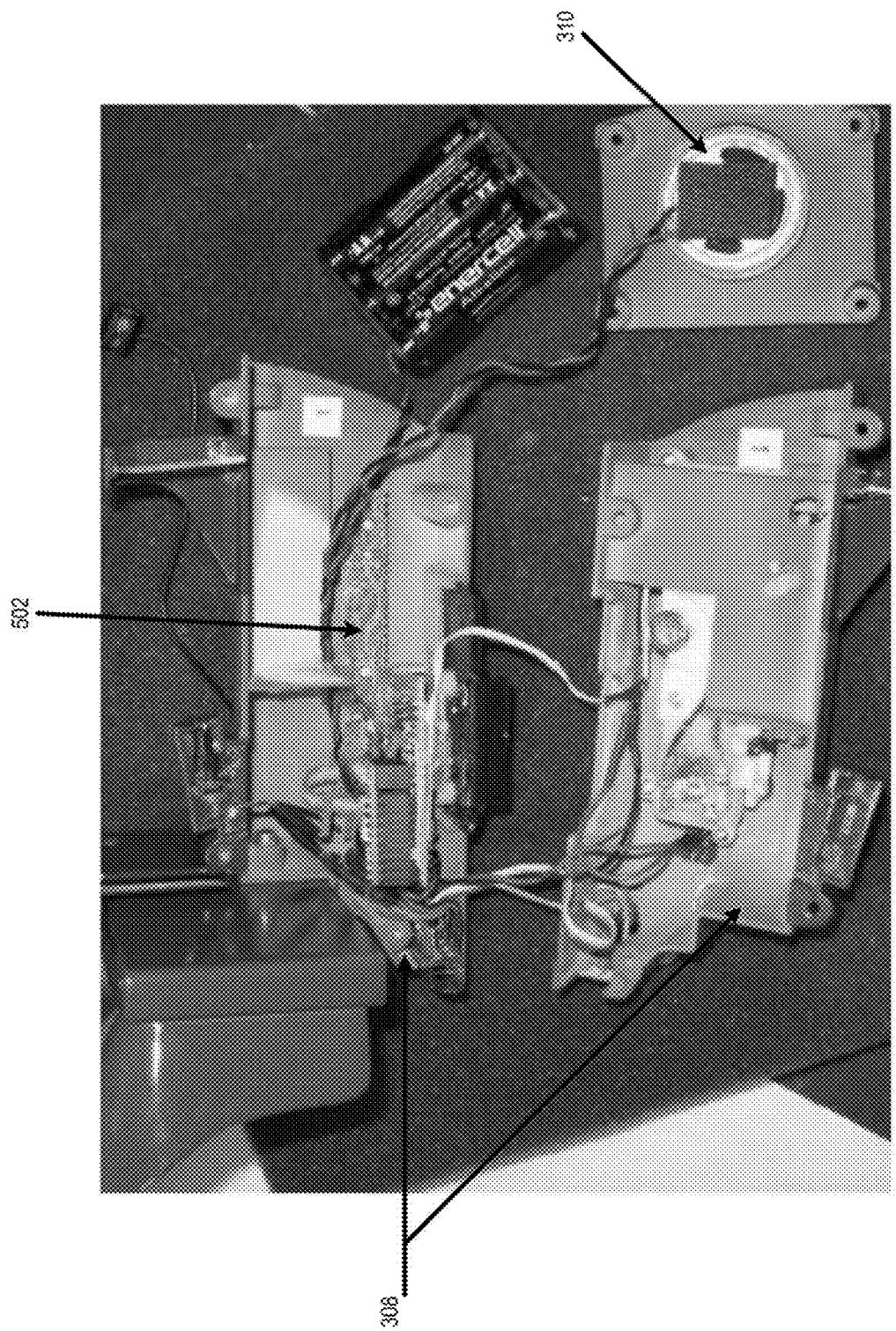
FIG. 5 is a bisected view of a housing containing a circuit board and a speaker according to various embodiments presented herein.

A bisected view of an exemplary housing 308 containing a circuit board 502 and a speaker 310 is depicted in FIG. 5. A circuit board 502 having a variety of control circuitry 503 is contained within the housing 308. The control circuitry 503 can include a processor, memory, and code executing in the processor which is suitable for, and configured to, provide audible and/or visual alerts to the user, as a function of the operation of the toy launching device. Operatively connected to the circuit board 502 are the speakers 310, the trigger sensor 402, and the buttons 312. According to one embodiment, the speakers 310, trigger sensor 402, and buttons 312 connect with the circuit board 502 using conventional wiring. In other arrangements, the speakers 310, trigger sensor 402, and/or the buttons 312 can connect to the circuit board 502 using other transmission mediums such as wireless and infrared interfaces.

In operation, the launching device 302 functions together with the housing 308 elements and trigger sensor 402 to provide the user with an enhanced launching device. Upon firing the trigger 304, the trigger sensor 402 is engaged, sending a signal to the control circuitry 503 on the circuit board 502 housed within the housing 308. The control circuitry 503 on the circuit board 502, being operatively connected to the speakers 310, can provide audio feedback to the user in a variety of forms. By way of example, the control circuitry 503 can play a shooting or explosion sound clip through the speaker 310 upon the engagement of the trigger sensor 402.

The circuit board 502 also includes control circuitry 503 that maintains a tally of instances that the trigger sensor 402 has been engaged. In doing so, the control circuitry can operate differently depending upon the tally. For instance, the control circuitry can be configured to provide different audio feedback through the speakers 310 once the trigger sensor 402 has been engaged a pre-defined number of times, signifying that the launching device's 302 virtual ammunition clip (reflected in the number of times the trigger sensor 402 has been engaged) is empty.

The buttons 312 are also operatively connected to the control circuitry 503 on the circuit board 502. When the various buttons are pressed, the control circuitry provides specific audio feedback through the speaker 310, correlated with the specific button pressed. By way of example, one button can be designated as a 'rocket launcher', and when pressed, a rocket launcher sound is played. The buttons 312 can also be configured and/or assigned functional roles. By way of example, one of the buttons 312 can be assigned as the 'reload' button.

As referenced above, the control circuitry 503 maintains a tally of instances that the trigger sensor 402 has been engaged. When the 'reload' button is pressed, the control circuitry resets the tally, and provides corresponding audio feedback through the speaker 310, thereby signifying that the virtual ammunition clip has been reloaded.

It should be readily understood that the launching device 302, together with the housing 308 elements and trigger sensor 402 can be integrated within the context of the various embodiments described above. In doing so, enhanced game play can be accomplished, incorporating and correlating real world and virtual elements. For example, the trigger sensor 402, buttons 312, and control circuitry 503 can operate as one or more of the signal generators 106 depicted in FIG. 1. When the trigger sensor 402 or buttons 312 are engaged, one or more corresponding signals 108, 110 are generated and conveyed to microphone 104 of mobile device 102, as described in detail above. The various signals 108, 110 are processed into digital commands, and correlated with real-time data 114, 116 to identify an action. In the present example, the various signals originating at the trigger sensor 402, buttons 312, and control circuitry 503 can be correlated with a real-time view from the mobile device's 102 camera 152 in order to identify whether a target was hit or missed, as described in detail above. Outputs 118, 120 can then be provided based on the identified actions, as described above. Other actions during game play can be readily appreciated, such as whether a car in a video game is on the road or off road, or crashing, sliding, and so on, and whether a chess piece has been moved, and from where to where, or whether pieces on a game board game have been manipulated, all in support of an interface to a mobile device to enhance game play.

It is to be understood that like numerals in the drawings represent like elements through the several figures, and that not all components and/or steps described and illustrated with reference to the figures are required for all embodiments or arrangements. It should also be understood that the embodiments and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for interfacing with a mobile device. The flowchart and block diagrams in the Figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A computer-implemented method comprising:
   receiving one or more audio signals, the one or more audio signals being generated based on a perception of an occurrence of a first event;
   processing, with one or more processors, the one or more audio signals into one or more first digital commands;
   capturing, substantially concurrent with receipt of the one or more audio signals, one or more images, the one or more images depicting an aspect of the occurrence of the first event;
   processing, with one or more processors, the one or more images to detect the aspect of the occurrence of the first event;
   correlating, with one or more processors, the one or more first digital commands with the aspect of the occurrence of the first event;
   identifying, with one or more processors, a first action based on the correlation of the one or more first digital commands with the aspect of the occurrence of the first event; and
   providing one or more outputs based on the first action.

2. The method of claim 1, further comprising maintaining a tally of the number of first digital commands processed.

3. The method of claim 1, further comprising defining, with respect to the one or more images, one or more scoring regions that correspond to the real-time data,
   wherein processing the one or more images comprises processing the one or more images with respect to at least one of the one or more defined scoring regions to detect the aspect of the occurrence of the first event, the aspect of the occurrence of the first event comprising the occurrence of the first event with respect to the at least one of the one or more defined scoring regions.

4. The method of claim 1, further comprising:
   capturing one or more videos corresponding to the first event; and
   wherein providing one or more outputs comprises embedding at least one of (a) an audio enhancement and (b) a video enhancement within the one or more videos based on the first action.

5. The method of claim 1, wherein the one or more audio signals are generated by a peripheral device, the peripheral device comprising a sports goal.

6. The method of claim 1, wherein the one or more audio signals are generated by a peripheral device, the peripheral device comprising a launching device.

7. The method of claim 1, wherein the audio signal is an audio tone with a frequency between 15 kHz and 20 kHz.

8. The method of claim 1, wherein providing one or more outputs comprises incrementing a score tally in relation to the occurrence of the first event with respect to a particular one of the one or more defined scoring regions.

9. The method of claim 1, further comprising:
   receiving one or more data items, the one or more data items pertaining to a second action, the second action comprising a correlation of one or more second digital commands with an aspect of an occurrence of a second event; and
   processing the first action and the one or more data items to determine a sequential precedence of at least one of (a) the first action and (b) the second action;
   wherein providing one or more outputs comprises determining one or more scoring outcomes based on the sequential precedence.

10. A system comprising: one or more processors configured to interact with a non transitory computer-readable medium in order to perform operations comprising;
    perceiving one or more visual signals, the one or more visual signals being generated by a peripheral device based on a perception of an occurrence of a first event;
    processing, with one or more processors, the one or more visual signals into one or more digital commands;
    capturing, substantially concurrent with perception of the one or more visual signals, one or more images, the one or more images depicting an aspect of the occurrence of the first event;
    processing, with one or more processors, the one or more images to detect the aspect of the occurrence of the first event;
    correlating, with one or more processors, the one or more digital commands with the aspect of the occurrence of the first event;
    identifying, with one or more processors, a first action based on the correlation of the one or more digital commands with the aspect of the occurrence of the first event;
    receiving one or more data items, the one or more data items pertaining to a second action, the second action comprising a correlation of one or more second digital commands with an aspect of an occurrence of a second event;

processing, with one or more processors, the first action and the one or more data items to determine a sequential precedence of at least one of (a) the first action and (b) the second action; and determining, with one or more processors, one or more scoring outcomes based on the sequential precedence.

11. A system comprising: one or more processors configured to interact with a non transitory computer-readable medium in order to perform operations comprising:

receiving one or more audio signals, the one or more audio signals being generated based on a perception of an occurrence of a first event;

processing, with one or more processors, the one or more audio signals into one or more first digital commands;

capturing, substantially concurrent with receipt of the one or more audio signals, one or more images, the one or more images depicting an aspect of the occurrence of the first event;

processing, with one or more processors, the one or more images to detect the aspect of the occurrence of the first event;

correlating the one or more first digital commands with the aspect of the occurrence of the first event;

identifying, with one or more processors, a first action based on the correlation of the one or more first digital commands with the aspect of the occurrence of the first event; and providing one or more outputs based on the first action.

12. The system of claim 11, further configured to perform operations comprising defining, with respect to the one or more images, one or more scoring regions that correspond to the real-time data, wherein processing the one or more images comprises processing the one or more images with respect to at least one of the one or more defined scoring regions to detect the aspect of the occurrence of the first event, the aspect of the occurrence of the first event comprising the occurrence of the first event with respect to the at least one of the one or more defined scoring regions.

13. The system of claim 11, wherein providing one or more outputs comprises incrementing a score tally in relation to the occurrence of the first event with respect to a particular one of the one or more defined scoring regions.

14. The system of claim 11, further configured to perform operations comprising:

capturing one or more videos corresponding to the first event; and wherein providing one or more outputs comprises embedding at least one of (a) an audio enhancement and (b) a video enhancement within the one or more videos based on the first action.

15. The system of claim 11, wherein the one or more audio signals are generated by a peripheral device, the peripheral device comprising a launching device.

16. The system of claim 11, wherein the audio signal is an audio tone with a frequency between 15 kHz and 20 kHz.

17. The system of claim 11, further configured to perform operations comprising:

receiving one or more data items, the one or more data items pertaining to a second action, the second action comprising a correlation of one or more second digital commands with an aspect of an occurrence of a second event; and processing the first action and the one or more data items to determine a sequential precedence of at least one of (a) the first action and (b) the second action;

wherein providing one or more outputs comprises determining one or more scoring outcomes based on the sequential precedence.

18. A computer-implemented method comprising:

perceiving one or more visual signals, the one or more visual signals being generated by a peripheral device based on a perception of an occurrence of an event;

processing the one or more visual signals into one or more digital commands;

capturing, substantially concurrent with perception of the one or more visual signals, one or more images, the one or more images depicting an aspect of the occurrence of the event;

processing the one or more images to detect the aspect of the occurrence of the event;

correlating, with one or more processors, the one or more digital commands with the aspect of the occurrence of the event;

identifying an action based on the correlation of the one or more digital commands with the aspect of the occurrence of the event; and providing one or more outputs based upon the action.

19. A computer-implemented method comprising:

receiving one or more data items, the one or more data items pertaining to an occurrence of an event;

capturing, substantially concurrent with receipt of the one or more data items, one or more images, the one or more images depicting an aspect of the occurrence of the event;

processing the one or more images to detect the aspect of the occurrence of the event;

correlating, with one or more processors, the one or more data items with the aspect of the occurrence of the event;

identifying an action based on the correlation of the one or more data items with the aspect of the occurrence of the event; and providing one or more outputs based upon the action.

20. The method of claim 19, wherein the one or more data items comprise at least one of:

(a) a real-time data stream,
(b) a global location of a device,
(c) an orientation of a device,
(d) a relative motion of a device,
(e) a direction of a device, and
(f) a change in acceleration of a device.

* * * * *